(12) United States Patent
Henneck et al.

(10) Patent No.: US 7,713,896 B2
(45) Date of Patent: May 11, 2010

(54) METHOD FOR PRODUCING CERAMIC GREEN COMPACTS FOR CERAMIC COMPONENTS

(75) Inventors: Stefan Henneck, Leonberg (DE); Friederike Lindner, Gerlingen (DE); Alfons Kelnberger, Stuttgart (DE); Huu Nguyen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 800 days.

(21) Appl. No.: 10/560,125

(22) PCT Filed: Apr. 14, 2004

(86) PCT No.: PCT/DE2004/000777

§ 371 (c)(1),
(2), (4) Date: Apr. 12, 2006

(87) PCT Pub. No.: WO2004/110954

PCT Pub. Date: Dec. 23, 2004

(65) Prior Publication Data

US 2006/0226569 A1  Oct. 12, 2006

(51) Int. Cl.
*C04B 35/491* (2006.01)
(52) U.S. Cl. .................. 501/134; 524/284; 524/306; 524/308; 524/310; 524/311; 524/314; 524/315; 524/556
(58) Field of Classification Search .................. 524/284
See application file for complete search history.

(56) References Cited

U.S. PATENT DOCUMENTS 6,533,966 B1 * 3/2003 Nonninger et al. ....... 252/520.1
6,599,463 B2   7/2003 Kato et al.
2002/0019462 A1   2/2002 Takata et al.
2003/0098529 A1 * 5/2003 Drumm et al. ............... 264/624
2004/0106508 A1 * 6/2004 Scheying et al. ............. 501/99

FOREIGN PATENT DOCUMENTS

| DE | 100 62 672 | 8/2001 |
|---|---|---|
| EP | 0 313 412 | 4/1989 |
| EP | 0 601 457 | 6/1994 |
| FR | 2 835 828 | 8/2003 |
| JP | 61-146753 | 7/1986 |
| JP | 62-283858 | 12/1987 |
| JP | 9295870 | 11/1997 |
| JP | 10259062 | 9/1998 |
| WO | 94/07808 | 4/1994 |
| WO | WO 9530503 A1 * | 11/1995 |

OTHER PUBLICATIONS

Reddy et al. Journal of Materials Science 37 (2002), 929-934.*
http://pubs.acs.org/cen/topstory/8005/8005notw5.html.*
http://www2.mst.dk/common/Udgivramme/Frame.asp?http://www2.mst.dk/udgiv/Publications/2001/87-7944-407-5/html/default_eng.htm.*

* cited by examiner

*Primary Examiner*—David Wu
*Assistant Examiner*—Vu Nguyen
(74) *Attorney, Agent, or Firm*—Kenyon & Kenyon LLP

(57) ABSTRACT

A method for preparing ceramic green compacts for ceramic assemblies, especially ceramic multilayer assemblies. First, a dispersing agent solution is prepared by homogenizing a dispersing agent in a solvent mixture. Then, a binder solution is prepared by homogenizing a solvent mixture, a binder made of acrylatemethacrylate polymer and a softener. After preparing a first dispersion by homogenizing a ceramic powder and the dispersing agent solution and subsequent deagglomeration, a second dispersion is prepared by homogenizing the first dispersion and the binder solution, and subsequently removing air and highly volatile solvent components from the second dispersion.

19 Claims, No Drawings

METHOD FOR PRODUCING CERAMIC GREEN COMPACTS FOR CERAMIC COMPONENTS

FIELD OF THE INVENTION

The present invention relates generally to a method for producing green compacts for ceramic components, especially multi-layer components.

BACKGROUND INFORMATION

A crucial point in ceramic production technology is the development of new methods for producing green compacts. Examples of this are ceramic die-casting, gel-casting or near-net shape technology. All processes require the use of large quantities of organic processing aids, such as binders, lubricants or stabilizers which have to be removed from the green parts before or during the sintering process. This debindering process is, first of all, time and cost intensive, and secondly, it gives rise to environmental stresses because of the decomposition products created, that are in part injurious to health.

Binder systems for ceramic green compacts based on polyacrylates and polymethacrylates are available, and are used, for example, in the capacitor industry. In this connection, usually aqueous dispersions of polyacrylates are used for the very thin capacitor foils (2-20 μm). For layer thicknesses beginning at about 100 μm, aqueous systems are no longer economical, because of the long drying times. To the extent that formulations using acrylate resins are used in this connection, they derive from polyvinylbutyral (PVB) formulations, and one uses correspondingly known dispersing agents such as fish oil or phosphoric acid ester, and solvent mixtures such as ethanol/toluene.

Ceramic, especially piezoceramic components include several, especially many layers (many-layer components or multilayer components), and are usable, for example, as actors (add-on components)in piezostacks, in that by voltage control an inertia-poor mechanical deflection of comparatively high force is achieved, or are usable as a flexural element, in that the voltage control brings about a great deflection of lesser force, or they permit the generation of high electrical voltages or are used in appropriate devices for the detection of mechanical vibrations or the generation of acoustical vibrations.

Technical solutions up to now are predominantly based on ceramic masses of the structural type of perovskite of the general formula $ABO_3$, the piezoelectrical properties coming into effect in the ferroelectric state. Lead zirconate-titanate ceramics $Pb(Zr_{1-x}Ti_x)O_3$ (PZT), modified by certain additives, have proven especially advantageous. Between ceramic layers produced according to typical methods of ceramic foil technology there are noble metal internal electrodes that are applied using silk screen printing. The noble metal electrodes permit thermally eliminating the dispersing agents and binders used, as well as the additional organic additives and also the organic components of the silk screen printing metal paste from the multilayer stacks into the air, using depolymerization and oxidation, so that, subsequently, sintering compacting at ca. 1100 to 1150° C. is made possible without reduction effects, possibly caused by remaining carbon residues, become effective, which would negatively influence the properties of the ceramics as a result of reduction reactions.

German patent document no. 100 62 672 A1 refers to piezoelectric components in monolithic multilayer construction, having a stack of at least two ceramic layers and an electrode layer, situated between two ceramic layers, in which the electrode layer contains copper. Using these copper-containing internal electrodes, a practically complete debindering succeeds before the application of the sintering compacting under inert conditions in that one supplies plenty of steam to the inert atmosphere during debindering, and permits only a certain partial pressure of oxygen that leaves the copper-containing internal electrode undamaged. This creates the supposition that, in the process of the subsequent sintering compacting, piezoactors having optimal property values of the ceramics are obtained, that are not second to, or even surpass a piezoceramic layer of respective composition, separated under analogous conditions from the copper-containing electrode layer or even sintered in air. Polyurethane dispersion is used as binder in German patent document no. 100 62 672 A1.

Formulations for casting slip based on solvent mixtures not having aromatic compounds, such as toluene or xylene and not having chlorinated hydrocarbons such as trichloroethylene are not known up to the present, especially in combination with lead-containing powders (e.g. PZT).

SUMMARY OF THE INVENTION

The exemplary method according to the present invention for producing ceramic green compact has the advantage, compared to the related art, that debindering may be carried out for ceramic multilayer components at substantially better time saving, at lower temperatures and consequently in a substantially more cost-effective manner.

One additional advantage is that, using the ceramic green compact produced according to the exemplary method and/or exemplary embodiment of the present invention, constructed ceramic multilayer components having copper internal electrodes may have debindering performed on them in air.

Furthermore, it is advantageous that the removal of the decomposition products created by the thermal debindering may take place harmlessly and completely.

Advantageous further refinements of the exemplary method and/or exemplary embodiment of the present invention result from the measures described herein.

DETAILED DESCRIPTION

An improved formulation is introduced for a casting slip based on acrylatemethacrylate copolymers for producing ceramic green compacts for ceramic multilayer components, especially for piezo-multilayer actors, which makes possible a time-saving, simple and complete thermal debindering of green ceramic multilayer components, the maximum debindering temperature not exceeding 350° C. In connection with the PZT ceramic, the complete decomposition of the binder is finished at these temperatures. This is caused by the catalyzing effect of the PZT surface on the acrylate binder. In this context, a residual carbon content of less than 100 ppm is obtained. The decomposition mechanism is predominantly depolymerization. In this context, the structure of the carbon chain ("backbone") is attacked, so that mainly monomers are formed and discharged. The formation of pyrolysis carbon hardly takes place at all in this context.

The formulation according to the exemplary method and/ or exemplary embodiment of the present invention also makes it possible quickly and in an error-free manner to perform debindering of ceramic multilayer components having oxygen-sensitive but cost-effective internal electrode materials, such as copper, in air instead of in an atmosphere poor in oxygen, without there occurring an unacceptable oxidation of the electrode layers.

In the binder systems used, the thermal decomposition of the polymer occurs in the first place by depolymerization, which leads to the formation of highly volatile monomers, whereas in the decomposition PVB-based systems, that have been used up to the present, first of all the side groups are split off, and the remaining carbon chain ("backbone") is decomposed oxidatively only at higher temperatures.

The low residual carbon content of less than 100 ppm, achieved by using the formulation according to the exemplary method and/or exemplary embodiment of the present invention, is therefore particularly important, because, when it comes to PZT-based ceramics, carbon acts as a reducing agent for PbO. Together with copper, lead forms a low-melting alloy and, for example, in the case of PZT actors having copper-containing internal electrodes, it may lead to fusing of the electrodes and consequently to the destruction of the component.

The green compacts according to the exemplary method and/or exemplary embodiment of the present invention for ceramic multilayer components are obtained by using a novel formulation of a casting slip, the method having the following steps:

1) Preparation of the Dispersing Agent Solution

The dispersing agent solution is prepared by weighing in and homogenizing dispersing agents and a mixture of solvents having a proportion of approximately 50% by weight, with respect to the total solvent proportion of the casting slip.

Dispersing agents that have turned out to be advantageous are polymeric dispersing agents having acid groups which, without aromatic hydrocarbons, i.e. without nonpolar solvent components, develop a sufficient dispersing effect. Such dispersing agents are known from the lacquer industry, for example, as Disperbyk 102, 110, 111, 140, 142 and 180 (from the firm of BYK-Chemie). The use of organic acids, which may be so-called oxa acids such as, for example, 3,6-dioxaheptanoic acid, 3,6,9-trioxadecanoic acid, 3,6,9-trioxaundecanedioic acid or polyglycol diacids, in combination with the above-named complex dispersing agents, is necessary in order to achieve an optimal dispersing effect. The amounts to be added are a function of the BET surface of the PZT powder used (the greater the BET surface, the higher the proportion of oxa acid) and they vary within the range of 0.5-2.0% by weight of active ingredient with respect to the PZT powder.

Being able to omit aromatic hydrocarbons as solvents, which goes along with the above-named dispersing agents, is a decisive advantage of the exemplary method according to the present invention, since these substances are injurious to health and consequently have to be marked as such.

Mixtures of low alcohols, esters and ketones, such as ethanol, isopropanol, n-propanol, n-butanol, ethyl acetate, butyl acetate, 1-methoxy-2-propyl acetate, methylethyl ketone have emerged as solvents which in their volatility and their proportions are adjusted to one another in such a way that that, during the casting process, when it comes to drying, they are able to be driven off gently, one after another. One example of such a mixture is the mixture of ethanol:butyl acetate:butanol, in the proportion (wt. %) 40:30:30. However, other mixtures are also possible. Because they support the dispersing effect and because of their favorable influence on the flowing behavior of the casting slip, the proportion of alcohols cannot be done without. It has proven advantageous if at least one alcohol is contained in the mixture.

2) Preparation of the Binding Agent Solution

The binding agent solution is prepared by weighing in and homogenizing solvent mixture, binder and softener, which may be in the proportion of 70:20:10. Generally, the proportion of solvent is in the range of 60-80% by weight, and the proportion of binder to softener is in the range of 55:45 to 75:25% by weight.

According to the exemplary method and/or exemplary embodiment of the present invention, acrylatemethacrylate copolymers, such as Paraloid B-72 (from the firm of Rohm & Haas), Elvacite 2014, 2042, 2043, 4021 (from the firm of Lucite International) are used as binders, which have the above-named advantages (debindering temperature <350° C., residual carbon content <100 ppm).

Ester-based, phthalate-free softeners may be used as softeners, since these exert a favorable decomposition behavior or rather, a favorable influence on the thermal debindering behavior of the ceramic multilayer components. In addition, phthalate-free softeners are of no concern health-wise. The esters of citric acid and adipic acid, such as tributyl citrate, acetyltributyl citrate, bis-2-ethylhexyl adipate and isononyl adipate have proven especially advantageous.

3) Preparation of a Pre-slip (First Dispersion)

A first dispersion (pre-slip) is prepared by weighing in a ceramic powder, especially a PZT powder, and the dispersing agent solution prepared in step 1 in the proportion of 70:30 to 90:10% by weight, depending on the concentration of the binder solution, which may be 85:15% by weight, homogenizing and deagglomerating in a vibratory mill or an annular gap mill using $ZrO_2$ grinding elements over a duration of 0.1 to 10 hours, which may be 3 hours.

4) Preparation of the Casting Slip (Second Dispersion)

The first dispersion (pre-slip) prepared in step 3 and the binder solution from step 2 are weighed in at a proportion of 70:30 to 90:10% by weight, which may be 80:20% by weight, homogenized and deagglomerated in a vibratory mill or an annular gap mill using $ZrO_2$ grinding elements over a duration of 0.1 to 5 hours, which may be 1 hour.

5) Preparing the Casting Slip and Setting the Rheology

Using a vacuum pump, air and highly volatile solvent components are simultaneously removed from the casting slip (second dispersion) prepared in step 4, and the viscosity is set for casting on conventional foil casting equipment, which may be according to the known doctor blade method. In this context, a mixing vessel is evacuated while moving the slip using a stirring mechanism and while bringing the contents to room temperature. At a shear rate of 6.8 1/S, the viscosity is set to a value of 1500 to 4000 mPas, which may be to 2000 mPas.

The advantage of the multilayer components, built up using the green compacts obtained according to the above method, is above all that they may be debindered in a substantially more time-saving way, at lower temperatures and thus in a substantially more cost-effective way when compared to the related art.

A further advantage is that multilayer components, especially piezomultilayer actors based on PZT, having, in comparison to noble metals (Pt, Ag, Pd and combinations thereof) more oxidation sensitive, but more cost-effective internal electrodes, such as those made of passivated copper, may, because of the lower debindering duration and debindering temperature, have debindering performed on them in air. Up to now, in this connection, this required long (3 days and more), complicated, debindering processes that were controldemanding and consequently costly, under inert conditions (nitrogen and/or $H_2$ and/or $H_2O$). The process expenditure becomes substantially less because of the exemplary method according to the present invention.

Yet one more advantage is that, in thermal debindering, harmless decomposition products are created, which may be completely discharged. The result is residual carbon contents of less than 100 ppm

What is claimed is:

1. A method for preparing ceramic green compacts for ceramic components, the method comprising:
   a) preparing a dispersing agent solution by homogenizing one or more dispersing agents in combination with an organic acid in a solvent mixture to provide a dispersing agent solution;
   b) preparing a binder solution by homogenizing the solvent mixture from step a), at least one acrylatemethacrylate copolymers as the binder and at least one softener;
   c) preparing a first dispersion by homogenizing a ceramic powder and the dispersing agent solution, and subsequent deagglomeration;
   d) preparing a second dispersion by homogenizing the first dispersion and the binder solution; and
   e) removing air and highly volatile solvent components from the second dispersion.

2. The method of claim 1, wherein polymeric dispersing agents having acid groups are used as the dispersing agents.

3. The method of claim 1, wherein oxa acids are used as the organic acid.

4. The method of claim 3, wherein the oxa acids are selected from the group consisting of 3,6-dioxaheptanoic acid, 3,6,9-trioxadecanoic acid, 3,6,9-trioxaundecanedioic acid and polyglycol diacid.

5. The method of claim 1, wherein the solvent mixture is selected from the group consisting of alcohols, esters and ketones, the solvent mixture containing at least one alcohol.

6. The method of claim 5, wherein the solvent mixture is selected from the group consisting of ethanol, isopropanol, n-propanol, n-butanol, ethyl acetate, butyl acetate, 1-methoxy-2-propyl acetate and methylethyl ketone.

7. The method of claim 1, wherein a thermal decomposition of a binder polymer occurs by depolymerization.

8. The method of claim 1, wherein the softener that is used is an ester-based, phthalate-free softener.

9. The method of claim 8, wherein the softener is an ester of citric acid or adipic acid.

10. The method of claim 8, wherein the softener is selected from the group consisting of tributyl citrate, triethyl citrate, acetyltributyl citrate, bis-2l-ethylhexyl adipate and isononyl adipate.

11. The method of claim 1, wherein a ceramic powder that is used includes a PZT powder.

12. The method of claim 10, wherein the ceramic powder and the dispersing agent solution are homogenized at a proportion between 70:30 to 90:10.

13. The method of claim 10, wherein the ceramic powder and the dispersing agent solution are homogenized at a proportion between 70:30 to 85:15.

14. The method of claim 1, wherein the first dispersion and the binder solution are homogenized at a proportion between 70:30 to 90:10.

15. The method of claim 1, wherein the first dispersion and the binder solution are homogenized at a proportion between 70:30 to 80:20.

16. The method of claim 1, wherein the removing of air and the highly volatile solvent components from the second dispersion takes place simultaneously, with the aid of a vacuum pump.

17. The method of claim 1, wherein a proportion of the binder to the softener is in a range of 55:45 and 75:25.

18. The method of claim 1, wherein a proportion of the binder to the softener is in a range of 55:45 and 67:33.

19. The method of claim 1, wherein the ceramic components are multilayer assemblies.

* * * * *